United States Patent Office
3,813,405
Patented May 28, 1974

3,813,405
THIENYLMETHYL-N,N-DISUBSTITUTED-
CARBAMATES
Masahiro Aya, Masao Miyamoto, Nobuo Fukazawa, and Shigeki Ohsuga, Tokyo, Japan, assignors to Bayer Aktiengesellschaft, Leverkusen, Germany
No Drawing. Filed Jan. 28, 1971, Ser. No. 110,581
Claims priority, application Japan, Feb. 2, 1970, 45/8,584
Int. Cl. C07d 29/36, 63/14
U.S. Cl. 260—293.68                    11 Claims

ABSTRACT OF THE DISCLOSURE

Novel thiol and dithiocarbamic acid esters of the formula

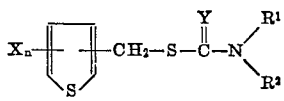

in which
X is halogen,
Y is oxygen or sulfur,
$R^1$ and $R^2$, which may be the same or different, are lower alkyl, benzyl, cycloalkyl or aryl, or together with the nitrogen form a heterocyclic radical with 5, 6 or 7 ring members, and
n is 0, 1 or 2,
are outstandingly effective as herbicides, especially as selective herbicides for use in controlling weeds in paddy field.

---

The present invention relates to novel thiol and dithiocarbamic acid esters, to herbicidal compositions containing them and to their use as herbicides.

Pentachlorophenol (PCP) has been widely used to control *Echinochloa crus-galli* (barnyard grass), a weed growing in paddy fields. However, PCP has serious disadvantages: it is not only extremely irritating to mucous membranes and human skin, but also very poisonous to fish. Therefore, the period and scope of its usage are limited. It is also difficult to formulate. Another herbicide, for the control of *Eleochalis acicularis* (spikerush), a weed growing at the same season as barnyard grass, 2-methyl-4-chlorophenoxyacetic acid (MCP) has been used, but MCP is not so effective for that purpose.

It is indicated by French Pat. No. 1,328,112 that benzyl-N,N-dialkylthiolcarbamic acid esters have herbical activity.

The invention provides thiol and dithiocarbamic acid esters of the general formula:

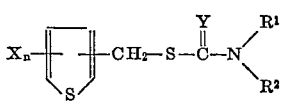

in which
X is halogen, preferably chlorine or bromine,
Y is oxygen or sulfur,
$R^1$ and $R^2$, which may be the same or different, are lower alkyl (preferably with 1-4 carbon atoms), benzyl, cycloalkyl or aryl, or together with the nitrogen form a heterocyclic radical with 5,6 or 7 ring members, and
n is 0, 1 or 2, preferably 1.

The compounds of the present invention show strong herbicidal activity when used not only before the germination of barnyard grass but also at the 1-3 leaves stage, under irrigation or inundation conditions in either case.

Also surprisingly, the compounds of the present invention are far less harmful to rice than the aforementioned benzylthiolcarbamate. Therefore, the present compounds are more useful than many other herbicides now on the market which show herbicidal activity only before or just after the germination of barnyard grass. Moreover, causing very little harm to rice plant, they can control weeds in paddy fields and thus save much labor in cultivation if applied a week or two after transplantation, a stage for which no satisfactory control method is available at present.

The compounds of the present invention have very strong herbicidal activity when absorbed through the roots; they can be used as non-selective or as selective herbicides against weeds including those in paddy fields when appropriately applied, especially during soil treatment before germination.

The invention provides a process for the production of a compound of formula (I) in which
(a) A thienylmethyl halide of the general formula:

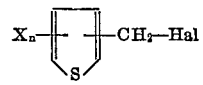

(II)

is reacted with a thiocarbamic or dithiocarbamic acid salt of the general formula:

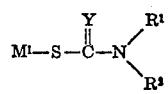

(III)

or
(b) A thienylmethyl halide of the general formula (II) is reacted with a compound of the formula:

CYS                                    (IV)

and a compound of the general formula:

(V)

and a compound of the formula:

$M^2$—OH                               (VI)

or
(c) A thienylmethyl mercaptan of the general formula:

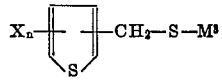

(VII)

is reacted with a compound of the general formula:

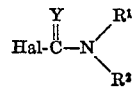

(VIII)

or
(d) A thienyl methyl mercapto carbonyl halide of the general formula:

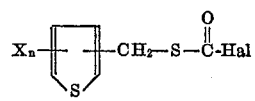

(IX)

is reacted with an amine of the general formula:

(V)

in which
X, n, $R^1$, $R^2$ and Y have the same meanings as in formula (I), $M^1$ is an alkali metal or ammonium,
$M^2$ is an alkali metal,
$M^3$ is hydrogen, an alkali metal or ammonium, and
Hal is halogen.

Process variant (a) is illustrated by the following formula scheme:

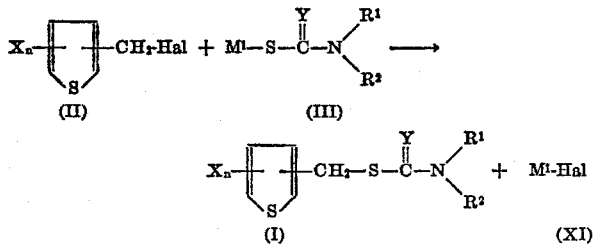

Examples of the compounds of the general formula (II) are 2-thienylmethyl chloride, 5-chloro (or -bromo)-2-thienylmethyl chloride, 2,5-dichloro (or -dibromo)-3-theinylmethyl chloride, corresponding bromides and other halides, and the like.

The compounds of the general formula (III) are thiolcarbamic acid salts or dithiolcarbamic acid salts. Examples of the salts of carbamic acid are N,N-dimethyl-, N,N-diethyl-, N,N-di-n-(or iso-)propyl-, N,N-di-n-(iso-, sec.- or tert.-)butyl-, N,N-diallyl-, N-methyl-N-n-butyl, N,N-dibenzyl-, N-methyl-N-benzyl-, N-methyl-N-cyclohexyl-, N,N-pyrrolidinyl, N,N-piperidinyl-, and N,N-hexamethylene-thiolcarbamic or -dithiocarbamic acid sodium salts, and the like, corresponding potassium or ammonium and other metal salts.

The reaction in process variant (a) is preferably effected in the presence of an inert organic solvent.

Preferred solvents include aliphatic and aromatic hydrocarbons (which may be halogenated), for example, benzine, methylene chloride, chloroform, carbon tetrachloride, benzene, chlorobenzene, toluene and xylenes; ethers, for example, diethyl ether, dibutyl ether, dioxane and tetrahydrofuran; lower-boiling alcohols, for example, methanol, ethanol and isopropanol; and ketones, for example, acetone, methyl ethyl ketone, methyl isopropyl ketone and methyl isobutyl ketone. The use of lower aliphatic nitriles, for example, acetonitrile or propionitrile is also possible.

Process variant (b) is illustrated by the following formula scheme:

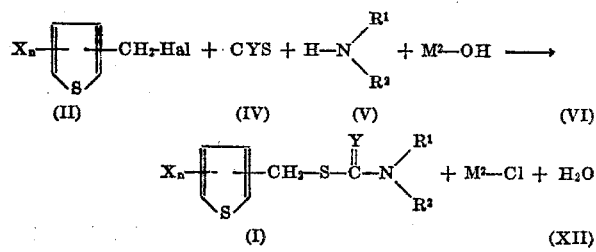

When Y is oxygen in formula (IV), thiolcarbamic acids of the present invention can be obtained by process variant (b), and when Y is sulfur, dithiocarbamic acid esters can be obtained. Examples of amines of formula (V) are N,N-dimethyl-, N,N-diethyl-, N,N-di-n-(or iso-)propyl-, N,N-di-n-(iso-, sec.-, or tert.-)butyl-, N,N-diallyl-, N-methyl-N-n-butyl, N,N-dibenzyl-, N-methyl-N-benzyl-, N-methyl-N-cyclohexyl- and N-methyl-N-cyclohexyl-amine, pyrrolidine, piperidine and hexamethyleneimine, and the like.

Process variant (b) can be performed using an inert organic solvent, preferably one of those indicated for variant (a).

Process variant (c), in which Hal is preferably chlorine, is illustrated by the following formula scheme:

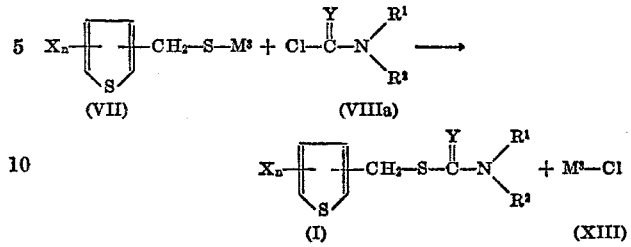

Examples of compounds of formula (VII) include 2-thienylmethylmercaptan, 5-chloro (or bromo)-3-thienylmethylmercaptan, 2,5-dichloro (or 2,5-dibromo-)-3-thienylmethylmercaptan and alkali metal and ammonium salts. $M^3$ is preferably hydrogen or sodium.

As examples of carbamoylchlorides and thiocarbamoylchlorides of the general formula (VIIIa), there may be mentioned N,N-dimethyl-, N,N-diethyl-, N,N-di-n-(or iso-)propyl-, N,N-di-n-(iso-, sec.- or tert.-) butyl-, N,N-diallyl-, N-methyl-N-n-butyl, N,N-dibenzyl-, N-methyl-N-benzyl-, N-methyl-N-cyclohexyl-, N,N-pyrrolidinyl-, N,N-piperidinyl-, and N,N-hexamethylenecarbamoyl-(or thiocarbamoyl)-chloride, and the like.

The reaction of process variant (c) can also be carried out in the presence of an acid binding agent, if necessary. For this purpose, carbonates and bicarbonates of alkali metals, such as sodium bicarbonate, potassium bicarbonate or sodium carbonate, alcoholates of alkali metals such as potassium or sodium methylate or ethylate, and aliphatic, aromatic or heterocyclic tertiary bases such as triethylamine, dimethylaniline, and pyridine can be used.

Process variant (d), in which Hal is preferably chlorine, is illustrated by the following formula scheme:

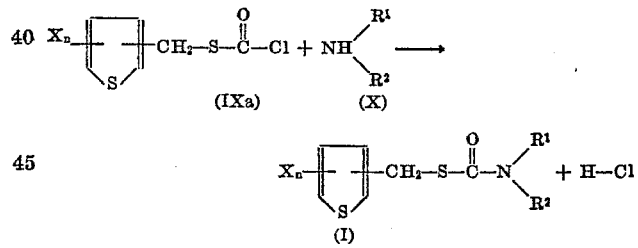

The compounds of the general formula (IXa) to be used as starting materials include, for example, 2-thienylmethylthiocarbonylchloride, 5-chloro (or -bromo)-2-thienylmethylcarbonylchloride, 2,5-dichloro (or -dibromo)-3-thienylmethylthiocarbonylchloride, etc.

Examples of amines of formula (X) include the same amines as the abovementioned formula (V).

Process variant (d) can be carried out using an inert organic solvent as mentioned for variant (a). It can be carried out in the presence of an acid binding agent as mentioned for variant (c).

Compared with other known compounds synthesized in an analogous manner and having similar structural formulae, the compounds of the invention are distinguished by their excellent herbicidal activity and their low toxicity to warm-blooded animals. The present active compounds generally show non-selective (i.e. total) herbicidal effects when applied in larger quantity (generally 5–40 kg. per hectare), but when applied in smaller amounts (generally 1.25–5 kg. per hectare), they show excellent selective herbicidal effects so that the compounds are available as germination inhibiting agents, especially as weed controlling agents.

The compounds according to the present invention can be effectively used as germination-controlling agents especially weed-controlling agent.

The term weed used herein is intended broadly to cover most plants growing where they are not desired.

The compounds according to the present invention have good activity against the following plants, and exhibit excellent selective weed-killing or withering effects when used in appropriate amounts (for example 1.25 to 5 kg. per hectare), and can be especially useful as herbicides in the cultivation of crops indicated by an asterisk in the following list.

Plant name:
- Dicotyledons:            Latin name
  - Mustard — Sinapis.
  - Rape — Galium.
  - Catch weed — Stellaria.
  - Chickweed — Matricaria.
  - Sweet false — Lepidium.
  - French weed — Galinsoga.
  - Goosefoot — Chenopodium
  - Nettle — Urtica.
  - Groundsel — Senecio.
  - Tampala — Amaranthus.
  - Purslane — Portulaca.
  - Cotton — * Gossypium.
  - Carrot — * Daucus.
  - Pulse — * Phaseolus.
  - Potato — * Solanum.
  - Coffee — * Coffea.
  - Beet — * Beta.
  - Cabbage — * Brassica.
  - Spinach — * Spinacia.
- Monocotyledons:
  - Timothy — Phleum.
  - *Eragrostis niwahokori* Honda — Poe.
  - *Festuca parvigluma* — Festuca.
  - Fiber grass — Digitaria.
  - Goose grass — Eleusine.
  - Foxtail — Setaria.
  - Ray grass — Bromus.
  - Barnyard grass — Echinochlora.
  - Maize — * Zea.
  - Rice plant — * Oryza.
  - Oats — * Avena.
  - Barley — * Hordeum.
  - Wheat — * Tritium.
  - Millet — * Panicum.
  - Sugar cane — * Saccharum.

The species of the above plants are considered to be typical examples of the genus identified by the Latin name. The applicability of the active compounds according to the present invention is, of course, not limited to these plants and they are effective for other analogous plants.

The active compounds according to the present invention can be utilized, if desired, in the form of the usual preparations, compositions or formulations with conventional inert (i.e. plant compatible or herbicidally inert) pesticide diluents or carriers.

These may be prepared in known manner, for example by mixing the active compounds with extenders, that is, liquid or solid or gaseous diluents and/or carriers, optionally with the use of conventional pesticide adjuvants, that is, emulsifying agents and/or dispersing agents and/or adhesive agents. In the case of the use of water as an extender, organic solvents and emulsifying agent can, for example, also be used as auxiliary solvents.

As liquid diluents or carriers, there are preferably used aromatic hydrocarbons, such as xylenes, toluene, benzene, dimethyl naphthalene or aromatic naphthas halogenated (chlorinated) aromatic or aliphatic hydrocarbons, such as chlorobenzenes, chloromethylene, chloroethylene or carbon tetrachloride, aliphatic hydrocarbons, such as cyclohexane or paraffins (for example petroleum fractions), alcohols, such as methanol or butanol, ketones such as acetone, methyl ethyl ketone or cyclohexanone, amines such as ethanol amine, ethers such as glycol monomethyl ether, strongly polar solvents, such as dimethyl formamide, dimethyl sulfoxide or acetonitrile, as well as water.

As solid diluents or carriers, there are preferably used ground natural minerals, such as clays, talc, chalk, i.e. calcium carbonate, attapulgite, montmorillonite, diatomaceous earth or pumice or ground synthetic minerals, such as highly dispersed silicic acid, alumima or silicates.

As gaseous diluents or carriers there may be used aerosol propellants which are gaseous at normal temperatures and pressures, such as Freon.

Preferred examples of adjuvants (diluents or carriers assistants) include non-ionic cationic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing or adhesive agents include lignin, sulfite waste liquors and methyl cellulose.

The compounds of the present invention can be used, if desired, together with other agricultural chemicals, for example insecticides, nematocides, fungicides (including antibiotics), herbicides, plant growth-regulators or fertilizers.

The herbicidal composition or formulation according to the present invention generally contains 0.1 to 95 percent by weight, preferably 0.5 to 90% by weight, of the active compound. However, the content of active ingredients may be varied in accordance with the formulation and the applying method, the purpose, the period of application the place of application and other circumstances.

The compounds may be formulated in any of the usual ways in the field of agricultural chemicals, for example solutions, emulsions, emulsion concentrates, wettable powders, aqueous solutions, oil formulations, aerosols, pastes, fumigants, dusting powders, coating granules, tablets, granules, pellets and the like.

The compounds may be applied to the weeds or its habitat in any of the usual ways, for example, by scattering spraying, atomizing, misting, dusting, mixing, fumigating, injecting or powder-coating methods.

Furthermore, the application can be effected by the so-called "ultra-low-volume" method. In this method it may be possible to use 95% to 100% of the active compound.

In use, the content of the active ingredient in the ready-to-use preparation can be varied over a broad range according to circumstances above. However, it may generally be preferable to use a range from 0.001 to 20% by weight, especially 0.005 to 15% by weight.

Also, the amount of active compound applied per unit area is usually about 15 to 2000 grams, preferably 40 to 1000 grams of active compound per 10 ares. However, in special cases, it may be possible to use more or less sometimes such variations may be required.

The invention therefore provides a herbicidal composition containing as active ingredient a compound according to the invention in admixture with a solid diluent or carrier or in admixture with a liquid diluent or carrier, if desired, containing adjuvant.

The invention also provides a method of combating weeds which comprises applying to these weeds or a habitat thereof a compound according to the invention alone or in the form of a composition containing as active ingredient a compound according to the invention in admixture with a solid or liquid diluent or carrier or adjuvant.

The invention also provides crops protected from damage by seeds by being grown in areas in which, immediately prior to and/or during the time of the growing, a compound according to the invention was applied alone or in admixture with a solid or liquid diluent or carrier. It will be seen that the usual methods of providing harvested crops may be improved by the present invention.

The invention is illustrated by the following examples. In all the examples, the numbers of the compounds correspond to those in Table 1, infra.

EXAMPLE 1

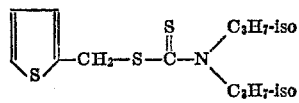 (4)

12.0 g. (0.06 mol) of sodium N,N-diisopropyldithiocarbamate were mixed with 200 ml. of acetone. Then, while the mixture was being stirred at room temperature, 6.63 g. (0.05 mole) of 2-thienylmethylchloride dissolved in 50 ml. of acetone were added dropwise thereto. When this addition was finished, the mixture was refluxed for two hours to complete the reaction. Then the sodium chloride by-product was filtered off, the acetone distilled, and 300 ml. of benzene were added to dissolve the residue. The benzene solution was washed with 1% hydrochloric acid, 1% sodium hydroxide and water, then dried over anhydrous sodium sulfate. After distilling off benzene in a reduced pressure distillation, 11.8 g. of 2-thienylmethyl-N,N-diisopropylthiocarbamate were obtained.

Yield: 86.3%; B.P.: 165–167° C./0.5 mm. Hg.

In a similar manner, 2-thienylmethyl-N-methyl-N-n-butyldithiocarbamate, 2-thienylmethyl - N,N - dibenzyldithiocarbamate, and 2-thienylmethyl-N,N-hexamethylenedithiocarbamate can be obtained when sodium N-methyl-N - n - butyldithiocarbamate, sodium N,N-dibenzyldithiocarbamate, or sodium N,N-hexamethylenedithiocarbamate, respectively, are used instead of sodium N,N-diisopropyldithiocarbamate.

EXAMPLE 2

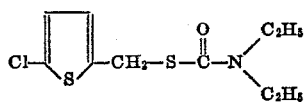 (19)

16.5 g. (0.1 mole) of 5-chloro-2-thienylmethylmercaptan were dissolved in 300 ml. of acetone and 10 ml. of 40% sodium carbonate were added thereto dropwise with stirring. After the completion of the addition, 13.6 g. (0.1 mole) of N,N-diethylcarbamoylchloride were added dropwise.

When this addition was finished, the solution was refluxed for 3 hours at room temperature to complete the reaction. After filtering off sodium chloride produced and distilling off acetone, 200 ml. of benzene were added so as to dissolve what was obtained. The benzene solution was washed with 1% hydrochloric acid, 1% sodium hydroxide and water, then dried over anhydrous sodium sulfate. By distilling off benzene in a reduced pressure distillation, 21.6 g. of 5-chloro-2-thienylmethyl-N,N-diethylthiolcarbamate were obtained.

Yield: 89.3%; B.P.: 136–138° C./0.4 mm. Hg.

In a similar manner, 5-chloro-2-thienylmethyl-N,N-diallylthiolcarbamate, 5-chloro-2-thienylmethyl-N-methyl-N-cyclohexylthiolcarbamate and 5-chloro-2-thienylmethyl-N,N-hexamethylenethiolcarbamate can be obtained when N,N-diallylcarbamoylchloride, N-methyl-N-cyclohexylcarbamoylchloride and N,N - hexamethylenecarbamoylchloride, respectively are used instead of N,N-diethylcarbamoylchloride.

Typical examples of compounds of the present invention are listed in Table 1. The table gives the boiling points or, if bracketed, the melting points of the compounds.

TABLE 1

| Compound No. | Structural formula | Physical property, B.P., °C. mm. Hg (M.P., °C.) |
|---|---|---|
| (1) | ![structure] thienyl-CH₂-S-C(=S)-N(CH₃)(CH₃) | 162–163/0.1 |
| (2) | thienyl-CH₂-S-C(=S)-N(C₂H₅)(C₂H₅) | 157–159/0.1 |
| (3) | thienyl-CH₂-S-C(=S)-N(C₃H₇-n)(C₃H₇-n) | 163–168/0.5 |
| (4) | thienyl-CH₂-S-C(=S)-N(C₃H₇-iso)(C₃H₇-iso) | 165–167/0.5 |
| (5) | thienyl-CH₂-S-C(=S)-N(CH₃)(C₄H₉-n) | 158–162/0.5 |
| (6) | thienyl-CH₂-S-C(=S)-N(CH₃)(C₆H₁₁) | 188–189/0.5 |
| (7) | thienyl-CH₂-S-C(=S)-N(CH₂-C₆H₅)(CH₂-C₆H₅) | (97–98) |

TABLE 1—Continued
| Compound No. | Structural formula | Physical property, B.P., °C. mm. Hg (M.P., °C.) |
|---|---|---|
| (8) | 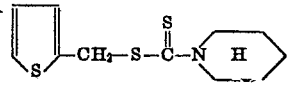 | 178–183/0.3 |
| (9) | 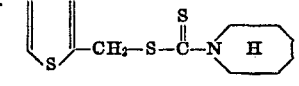 | 190–193/0.3 |
| (10) | 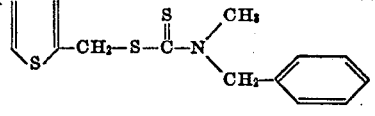 | 188–190/0.3 |
| (11) | 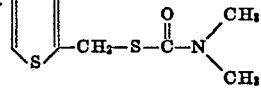 | 122–123/0.3 |
| (12) | 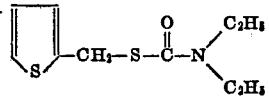 | 125–128/0.7 |
| (13) | 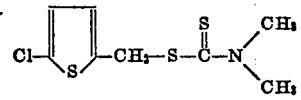 | (57–58) |
| (14) | 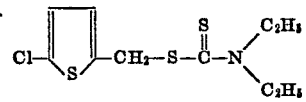 | 160–161/0.3 |
| (15) | 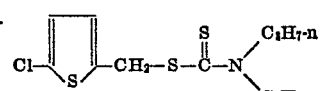 | 168–169/0.3 |
| (16) | 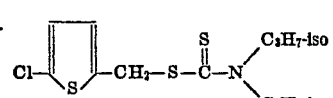 | 162–167/0.3 |
| (17) | 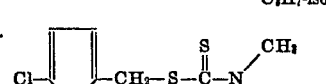 | 172–174/0.4 |
| (18) | 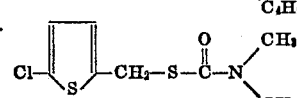 | 132–140/0.3 |
| (19) | 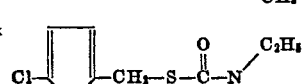 | 136–138/0.4 |
| (20) | 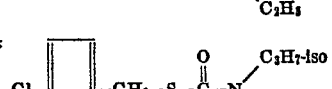 | 148–151/0.1 |
| (21) | 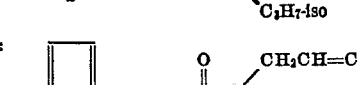 | 145–150/0.5 |
| (22) |  | 141–146/0.4 |

TABLE 1—Continued

| Compound No. | Structural formula | Physical property, B.P., °C. mm. Hg (M.P., °C.) |
|---|---|---|
| (23) | Cl–[thiophene]–CH₂–S–C(=O)–N(CH₃)(cyclohexyl-H) | 171–174/0.4 |
| (24) | Cl–[thiophene]–CH₂–S–C(=O)–N(pyrrolidinyl-H) | 152–156/0.4 |
| (25) | Cl–[thiophene]–CH₂–S–C(=O)–N(piperidinyl-H) | 159–162/0.4 |
| (26) | Cl–[thiophene]–CH₂–S–C(=O)–N(hexamethyleneimino-H) | 165–167/0.2 |
| (27) | Br–[thiophene]–CH₂–S–C(=S)–N(CH₃)(CH₃) | (65–66) |
| (28) | Br–[thiophene]–CH₂–S–C(=S)–N(C₂H₅)(C₂H₅) | 170–172/0.4 |
| (29) | Br–[thiophene]–CH₂–S–C(=S)–N(C₃H₇-n)(C₃H₇-n) | 182–183/0.4 |
| (30) | Br–[thiophene]–CH₂–S–C(=S)–N(C₃H₇-iso)(C₃H₇-iso) | 170–173/0.4 |
| (31) | Br–[thiophene]–CH₂–S–C(=S)–N(CH₃)(C₄H₉-n) | 168–175/0.4 |
| (32) | Br–[thiophene]–CH₂–S–C(=O)–N(CH₃)(C₂H₅) | 135–139/0.3 |
| (33) | Br–[thiophene]–CH₂–S–C(=O)–N(C₂H₅)(C₂H₅) | 140–145/0.3 |
| (34) | Br–[thiophene]–CH₂–S–C(=O)–N(C₃H₇-iso)(C₃H₇-iso) | 149–152/0.5 |
| (35) | Cl,Cl–[thiophene]–CH₂–S–C(=S)–N(CH₃)(CH₃) | 171–172/0.5 |

TABLE 1—Continued

| Compound No. | Structural formula | Physical property B.P., °C, mm. Hg (M.P., °C.) |
|---|---|---|
| (36) | Cl-[thiophene]-CH$_2$-S-C(=S)-N(C$_2$H$_5$)(C$_2$H$_5$), with Cl on thiophene | 185–186/1 |
| (37) | Cl-[thiophene]-CH$_2$-S-C(=S)-N(C$_3$H$_7$-iso)(C$_3$H$_7$-iso), with Cl on thiophene | 160–165/0.3 |
| (38) | Cl-[thiophene]-CH$_2$-S-C(=S)-N(CH$_3$)(C$_4$H$_9$-n), with Cl on thiophene | 172–173/0.5 |
| (39) | Cl-[thiophene]-CH$_2$-S-C(=O)-N(CH$_3$)(CH$_3$), with Cl on thiophene | 150–153/0.5 |
| (40) | Cl-[thiophene]-CH$_2$-S-C(=O)-N(C$_2$H$_5$)(C$_2$H$_5$), with Cl on thiophene | 148–152/0.5 |

EXAMPLE 3

15 parts of compound (4), 80 parts of diatomaceous earth and clay and 5 parts of the emulsifier "Runnox" (product of Toho Kagaku Kogyo Kabushiki Kaisha) are ground and mixed together to form a wettable powder. It is diluted with water for actual application. [Diatomaceous earth and clay (3:2); "Runnox": polyoxyethylene alkylarylether.]

EXAMPLE 4

30 parts of compound (19), 30 parts of xylene, 30 parts of "Kawakasol" (product of Kawasaki Kasei Kogyo K.K., Japan), and 10 parts of the emulsifier "Sorpol" (product of Toho Kagaku Kogyo K.K., Japan) are mixed with stirring to form an emulsifiable preparation. It is diluted with water for actual application. ["Kawakasol": aliphatic hydrocarbons with a high boiling point; "Sorpol": polyoxyethylenealkylarylether.]

EXAMPLE 5

10 parts of compound (18), 10 parts of bentonite, 78 parts of clay and 2 parts of lignin sulfonate are formed into a mixture and it is intimately mixed with 25 parts of water. The mixture is finely divided by means of an extruding granulator to give particles of 20–40 mesh, followed by drying at 40–50° C.

EXAMPLE 6

2 parts of compound (33) and 98 parts of the mixture of talc and clay were crushed and mixed to form a powder for application. [Talc and clay (3:1); the term "parts" used in the Examples 3 to 6 means "weight."]

EXAMPLE 7

Pre-emergence soil-treating test for weeds in paddy field

Solvent: 5 parts by weight of acetone.
Emulsifier: 1 part by weight of benzyloxypolyglycolether.

1 part by weight of active compound and the above-mentioned amount of the emulsifier and solvent were mixed and formulated into emulsifiable concentrates. And then the mixture thus obtained was diluted with water.

Test procedure.—A rice seedling (Kinmaze variety) at the 3–4 leaves stage was transplanted into a Wagner pot of 1/5,000" and filled with paddy soil under irrigation (inundation) conditions. After the seedling had taken root, seeds of barnyard grass, monochoria and broad-leaved weeds were sown and spikerush was transplanted into the soil.

The active compound preparation was applied to the pot in an amount of 500, 250 or 125 g. of active compound per 10 ares.

After 4 weeks, the effect on the weeds and the phytotoxicity to the rice plant were evaluated on scales from 0 to 5 as follows:

Effect on the weeds:
Herbicidal rate in comparison
with untreated area:                                  Dead
  5 _____ More than 95%.
  4 _____ More than 80%.
  3 _____ More than 50%.
  2 _____ More than 30%.
  1 _____ More than 10%.
  2 _____ Less than 10% (no effect).

Phytotoxicity rate in comparison
with untreated area:
  5 _____ More than 90%.
  4 _____ More than 50%.
  3 _____ More than 30%.
  2 _____ Less than 30%.
  1 _____ Less than 10%.
  0 _____ 0% (no phytotoxicity).

The results of the test are shown in Table 2.
(The term "a Wagner pot of 1/5,000" means a pot which covers a space of 0.02 m.²)

TABLE 2.—TEST RESULTS

| Compound | Content of active ingredient (g./10 ares) | Effect Barn-yard grass | Spike-rush | Mono-choria | Broad-leaved weed | Phyto-toxicity, rice plant |
|---|---|---|---|---|---|---|
| (1) | 500 | 5 | 4 | 4-5 | 4 | 0 |
|  | 250 | 4-5 | 3 | 4 | 4 | 0 |
|  | 125 | 3 | 0 | 3 | 3 | 0 |
| (2) | 500 | 5 | 4 | 4-5 | 4 | 0 |
|  | 250 | 4-5 | 3 | 4 | 3-4 | 0 |
|  | 125 | 3 | 1 | 3 | 3 | 0 |
| (3) | 500 | 5 | 4 | 4-5 | 4 | 0 |
|  | 250 | 3-4 | 3-4 | 4 | 4 | 0 |
|  | 125 | 3 | 2 | 3-4 | 3 | 0 |
| (4) | 500 | 5 | 4-5 | 4-5 | 4 | 0 |
|  | 250 | 5 | 3 | 4 | 3-4 | 0 |
|  | 125 | 3 | 1 | 4 | 3 | 0 |
| (5) | 500 | 5 | 4 | 4 | 4 | 0 |
|  | 250 | 4-5 | 4 | 4 | 3 | 0 |
|  | 125 | 3-4 | 3 | 3 | 2 | 0 |
| (6) | 500 | 5 | 4-5 | 4 | 4 | 0 |
|  | 250 | 4-5 | 4 | 4 | 3 | 0 |
|  | 125 | 3 | 3 | 3 | 3 | 0 |
| (7) | 500 | 5 | 4 | 4 | 4-5 | 0 |
|  | 250 | 4 | 3 | 4 | 4 | 0 |
|  | 125 | 3 | 2 | 3-4 | 3 | 0 |
| (8) | 500 | 5 | 4-5 | 5 | 4-5 | 0 |
|  | 250 | 4 | 4 | 4 | 4 | 0 |
|  | 125 | 3-4 | 3-4 | 3 | 4 | 0 |
| (9) | 500 | 5 | 5 | 5 | 4-5 | 0 |
|  | 250 | 4-5 | 4-5 | 5 | 4-5 | 0 |
|  | 125 | 3-4 | 4 | 4 | 3-4 | 0 |
| (10) | 500 | 5 | 3-4 | 4 | 4-5 | 0 |
|  | 250 | 3 | 3 | 3 | 4 | 0 |
|  | 125 | 2 | 2 | 3 | 3 | 0 |
| (11) | 500 | 5 | 5 | 5 | 5 | 0 |
|  | 250 | 5 | 4 | 5 | 4-5 | 0 |
|  | 125 | 4-5 | 3 | 3 | 3 | 0 |
| (12) | 500 | 5 | 5 | 5 | 5 | 0 |
|  | 250 | 5 | 5 | 5 | 4-5 | 0 |
|  | 125 | 4-5 | 4-5 | 5 | 3 | 0 |
| (13) | 500 | 5 | 5 | 5 | 5 | 0 |
|  | 250 | 4-5 | 4 | 4-5 | 4 | 0 |
|  | 125 | 4 | 3 | 3 | 2 | 0 |
| (14) | 500 | 5 | 4-5 | 4-5 | 5 | 0 |
|  | 250 | 4-5 | 4 | 4 | 4 | 0 |
|  | 125 | 4 | 3 | 3 | 3 | 0 |
| (15) | 500 | 5 | 4-5 | 4-5 | 4 | 0 |
|  | 250 | 4-5 | 3-4 | 4 | 4 | 0 |
|  | 125 | 3-4 | 2 | 3 | 3 | 0 |
| (16) | 500 | 5 | 4-5 | 4 | 4 | 0 |
|  | 250 | 4 | 4 | 3-4 | 4 | 0 |
|  | 125 | 3 | 3 | 3 | 3 | 0 |
| (17) | 500 | 5 | 4 | 4 | 4 | 0 |
|  | 250 | 4 | 3-4 | 3 | 4 | 0 |
|  | 125 | 3 | 3 | 3 | 3 | 0 |
| (18) | 500 | 5 | 5 | 5 | 5 | 0 |
|  | 250 | 5 | 5 | 5 | 5 | 0 |
|  | 125 | 5 | 4-5 | 5 | 5 | 0 |
| (19) | 500 | 5 | 5 | 5 | 5 | 0 |
|  | 250 | 5 | 5 | 5 | 5 | 0 |
|  | 125 | 5 | 5 | 5 | 5 | 0 |
| (20) | 500 | 5 | 5 | 5 | 5 | 0 |
|  | 250 | 5 | 4-5 | 5 | 5 | 0 |
|  | 125 | 5 | 4 | 4-5 | 4-5 | 0 |
| (21) | 500 | 5 | 5 | 5 | 5 | 0 |
|  | 250 | 5 | 5 | 4 | 4-5 | 0 |
|  | 125 | 5 | 5 | 4 | 4 | 0 |
| (22) | 500 | 5 | 4-5 | 5 | 5 | 0 |
|  | 250 | 5 | 4 | 4 | 4-5 | 0 |
|  | 125 | 5 | 3 | 4 | 4 | 0 |

TABLE 2—Continued

| Compound | Content of active ingredient (g./10 ares) | Effect Barn-yard grass | Spike-rush | Mono-choria | Broad-leaved weed | Phyto-toxicity, rice plant |
|---|---|---|---|---|---|---|
| (23) | 500 | 5 | 4 | 4-5 | 4 | 0 |
|  | 250 | 5 | 3-4 | 4 | 3 | 0 |
|  | 125 | 5 | 3 | 3 | 3 | 0 |
| (24) | 500 | 5 | 4-5 | 4 | 4 | 0 |
|  | 250 | 5 | 3-4 | 3 | 3-4 | 0 |
|  | 125 | 4 | 3 | 2-3 | 3 | 0 |
| (25) | 500 | 5 | 5 | 5 | 5 | 0 |
|  | 250 | 5 | 4-5 | 4-5 | 4-5 | 0 |
|  | 125 | 4-5 | 4 | 4 | 4 | 0 |
| (26) | 500 | 5 | 5 | 5 | 5 | 0 |
|  | 250 | 5 | 5 | 5 | 5 | 0 |
|  | 215 | 5 | 4-5 | 4-5 | 5 | 0 |
| (27) | 500 | 5 | 4 | 5 | 5 | 0 |
|  | 250 | 4 | 3-4 | 4-5 | 3 | 0 |
|  | 125 | 3-4 | 3 | 3 | 2 | 0 |
| (28) | 500 | 5 | 4-5 | 4-5 | 5 | 0 |
|  | 250 | 4-5 | 3-4 | 4 | 4 | 0 |
|  | 124 | 3 | 3 | 3 | 3 | 0 |
| (29) | 500 | 5 | 4-5 | 4-5 | 4-5 | 0 |
|  | 250 | 4 | 3-4 | 4 | 3-4 | 0 |
|  | 125 | 3 | 3 | 3 | 3 | 0 |
| (30) | 500 | 5 | 4-5 | 4-5 | 4 | 0 |
|  | 250 | 4-5 | 4 | 3-4 | 4 | 0 |
|  | 125 | 3-4 | 3 | 3 | 3 | 0 |
| (31) | 500 | 5 | 4 | 4 | 4-5 | 0 |
|  | 250 | 3-4 | 3-4 | 3-4 | 4 | 0 |
|  | 125 | 2 | 3 | 3 | 3 | 0 |
| (32) | 500 | 5 | 5 | 5 | 5 | 0 |
|  | 250 | 5 | 5 | 5 | 5 | 0 |
|  | 125 | 5 | 4-5 | 5 | 5 | 0 |
| (33) | 500 | 5 | 5 | 5 | 5 | 0 |
|  | 250 | 5 | 5 | 5 | 5 | 0 |
|  | 125 | 5 | 5 | 5 | 5 | 0 |
| (34) | 500 | 5 | 5 | 5 | 5 | 0 |
|  | 250 | 5 | 4-5 | 5 | 5 | 0 |
|  | 125 | 5 | 4 | 4-5 | 4-5 | 0 |
| (35) | 500 | 5 | 4 | 4-5 | 4 | 0 |
|  | 250 | 4 | 3 | 4 | 3 | 0 |
|  | 125 | 3 | 3 | 3 | 3 | 0 |
| (36) | 500 | 5 | 4-5 | 4-5 | 4 | 0 |
|  | 250 | 4 | 4 | 4 | 3-4 | 0 |
|  | 125 | 3 | 3 | 3-4 | 3 | 0 |
| (37) | 500 | 5 | 4-5 | 4 | 4-5 | 0 |
|  | 250 | 4 | 3-4 | 3-4 | 4 | 0 |
|  | 125 | 3-4 | 3 | 3 | 3 | 0 |
| (38) | 500 | 5 | 4 | 4 | 4 | 0 |
|  | 250 | 3-4 | 3 | 3-4 | 3 | 0 |
|  | 125 | 3 | 2 | 3 | 3 | 0 |
| (39) | 500 | 5 | 4-5 | 5 | 5 | 0 |
|  | 250 | 5 | 4 | 4-5 | 4-5 | 0 |
|  | 125 | 4-5 | 3-4 | 4 | 4 | 0 |
| (40) | 500 | 5 | 5 | 5 | 5 | 0 |
|  | 250 | 4-5 | 4-5 | 4-5 | 5 | 0 |
|  | 125 | 4-5 | 4 | 4 | 4-5 | 0 |
| (A)[1] | 500 | 5 | 5 | 5 | 5 | 2-3 |
|  | 250 | 5 | 4 | 5 | 4 | 2 |
|  | 125 | 4 | 3 | 4 | 4 | 1 |
| (B)[1] | 500 | 5 | 4 | 5 | 4 | 0 |
|  | 250 | 3 | 2 | 2 | 3 | 0 |
|  | 125 | 3 | 1 | 1 | 3 | 0 |
| Untreated plot (control) |  | 0 | 0 | 0 | 0 | 0 |

[1] Comparison.

NOTE.—1. Compound numbers in the table are the same as in the preparative examples and Table 1. 2. Broad-leaved weeds: Monochoria, *Rotala indica*, Koehne and False pempernel, etc. 3. A=French Patent No. 1,328,112: Benzyl-N,N-diethylthiolcarbamate. 4. B=Japanese Patent publication No. Sho 43-27347: Benzyl-N,N-diethyldithiocarbamate.

EXAMPLE 8

Test against paddy weeds under post-emergence soil treatment with irrigation conditions (test in concrete frame)

Into a concrete frame 50 cm. long, 50 cm. broad and 30 cm. deep were placed successive layers as follows: conglomerate stones (3 cm. deep), then sand (3 cm. deep), then paddy soil (5 cm. deep). These layers were well pressed down. Then they were covered with 5 cm. of screened paddy soil and paddy soil containing seeds of barnyard grass, monochoria, broadleaved weeds and fragments of spikerush. Two rice seedlings (Kinmaze variety) at the 3-4 leaves stage were transplanted in each of four places in the soil.

10-15 days after transplanting, when the barnyard grass had grown to the 2-3 leaves stage, the compounds of the present invention prepared in the same manner as in Example 7 were applied by injecting into the water. The water was reduced for 2 days by an amount of 3 cm. a day just after the injection and then maintained under irrigation (inundation) conditions 4 cm. deep. 30 days after the injection, the herbicidal effect on the weeds and the phytotoxicity to the rice plants were evaluated on scales similar to those of Example 7.

The results of the test are shown in Table 3.

TABLE 3.—TEST RESULTS

| Compound | Content of active ingredient (g./10 ares) | Effect | | | | Phytotoxicity, rice plant |
|---|---|---|---|---|---|---|
| | | Barnyard grass | Spikerush | Monochoria | Broadleaved weed | |
| (11) | 500 | 5 | 4-5 | 5 | 5 | 0 |
| | 250 | 4-5 | 4 | 4-5 | 4 | 0 |
| | 125 | 4 | 3 | 3 | 3 | 0 |
| (12) | 500 | 5 | 5 | 5 | 5 | 0 |
| | 250 | 4-5 | 4 | 4-5 | 4 | 0 |
| | 125 | 4 | 4 | 3 | 4 | 0 |
| (18) | 500 | 5 | 5 | 5 | 5 | 0 |
| | 250 | 5 | 4-5 | 5 | 5 | 0 |
| | 125 | 5 | 4 | 4 | 4 | 0 |
| (19) | 500 | 5 | 5 | 5 | 5 | 0 |
| | 250 | 5 | 4-5 | 5 | 5 | 0 |
| | 125 | 5 | 4-5 | 5 | 5 | 0 |
| (20) | 500 | 5 | 5 | 5 | 5 | 0 |
| | 250 | 5 | 4 | 3-4 | 4 | 0 |
| | 125 | 4 | 3 | 3 | 4 | 0 |
| (21) | 500 | 5 | 5 | 5 | 5 | 0 |
| | 250 | 5 | 4-5 | 3 | 4 | 0 |
| | 125 | 4-5 | 4-5 | 3 | 3 | 0 |
| (22) | 500 | 5 | 5 | 4-5 | 4-5 | 0 |
| | 250 | 4-5 | 4 | 4 | 3-4 | 0 |
| | 125 | 4 | 3 | 3 | 3 | 0 |
| (23) | 500 | 4 | 3-4 | 4 | 3-4 | 0 |
| | 250 | 3 | 3 | 3 | 2 | 0 |
| | 125 | 3 | 2 | 2 | 2 | 0 |
| (24) | 500 | 5 | 4 | 4 | 3-4 | 0 |
| | 250 | 4 | 3 | 2 | 3 | 0 |
| | 125 | 3 | 3 | 2 | 1 | 0 |
| (25) | 500 | 5 | 4-5 | 4 | 4 | 0 |
| | 250 | 4-5 | 3 4 | 3 | 3 | 0 |
| | 125 | 4 | 3 | 3 | 3 | 0 |
| (26) | 500 | 5 | 4-5 | 5 | 5 | 0 |
| | 250 | 5 | 4 | 4-5 | 4 | 0 |
| | 125 | 4 | 4 | 4 | 3 | 0 |
| (32) | 500 | 5 | 5 | 5 | 5 | 0 |
| | 250 | 5 | 4-5 | 5 | 5 | 0 |
| | 125 | 5 | 4 | 5 | 5 | 0 |
| (33) | 500 | 5 | 5 | 5 | 5 | 0 |
| | 250 | 5 | 4-5 | 5 | 5 | 0 |
| | 125 | 5 | 4-5 | 5 | 5 | 0 |
| (34) | 500 | 5 | 5 | 5 | 5 | 0 |
| | 250 | 5 | 4 | 3-4 | 4 | 0 |
| | 125 | 4 | 3 | 3 | 4 | 0 |
| (39) | 500 | 5 | 4-5 | 5 | 5 | 0 |
| | 250 | 4 | 3-4 | 5 | 4-5 | 0 |
| | 125 | 3 | 3 | 3 | 3 | 0 |
| (40) | 500 | 5 | 5 | 5 | 5 | 0 |
| | 250 | 4 | 4 | 4 | 4 | 0 |
| | 125 | 3 | 3 | 3 | 3 | 0 |
| A[1] | 500 | 5 | 4 | 4-5 | 5 | 2 |
| | 250 | 3 | 3-4 | 4-5 | 5 | 2 |
| | 125 | 3 | 3 | 3 | 4 | 1 |
| Untreated plot (control) | | 0 | 0 | 0 | 0 | 0 |

[1] Comparison.

NOTE.—1. Compound numbers in the table are the same as in the preparative example and Table 1. 2. Broad-leaved weeds: Monochoria, *Rotala indica*, Koehne and False pempernel, etc. 3. A=French Patent No. 1,328,112 Benzyl-N,N-diethylthiolcarbamate.

EXAMPLE 9

Test against various plants under soil treatment

Test procedure.—Seeds of sample plants were sown in a pot 20 by 30 cm. and after 24 hours the same mixture preparation as in Example 7 was sprayed on the soil in an amount of 20, 10, 5, 2.5 or 1.25 kg. per hectare. 3 weeks after spraying, the damage degree was evaluated on a scale ranging from 0 to 5, as follows:

0: no effect
1: slight damage or delay in growth
2: marked damage or inhibition of growth
3: heavy damage and only deficient development or only 50% emerged
4: plants partially destroyed after germination or only 25% emerged
5: plants completely dead or not emerged.

The active compounds, the amounts applied and the results obtained can be seen from the following Table 4.

TABLE 4.—TEST RESULTS

| Active compound | Concentration of active compound (kg./ha.) | Wheat | Barley | Rice plant | Cotton | Maize | Cabbage | Echinochloa | Portulacea | Chenopodium | Stellaria | Amaranthis | Digitaria |
|---|---|---|---|---|---|---|---|---|---|---|---|---|---|
| (19) | 20 | 4 | 4 | 4 | 4 | 4 | 4 | 5 | 5 | 5 | 5 | 5 | 5 |
|  | 10 | 1-2 | 2 | 1-2 | 2 | 2 | 2 | 5 | 5 | 5 | 5 | 5 | 5 |
|  | 5 | 0 | 0 | 0 | 0 | 0 | 0 | 5 | 5 | 5 | 5 | 5 | 5 |
|  | 2.5 | 0 | 0 | 0 | 0 | 0 | 0 | 5 | 5 | 5 | 5 | 5 | 5 |
|  | 1.25 | 0 | 0 | 0 | 0 | 0 | 0 | 5 | 4-5 | 4-5 | 4 | 4-5 | 4-5 |
| A (comparison) | 20 | 5 | 5 | 5 | 5 | 5 | 5 | 5 | 5 | 5 | 5 | 5 | 5 |
|  | 10 | 1-2 | 2 | 3 | 2 | 2 | 1-2 | 5 | 5 | 5 | 5 | 5 | 5 |
|  | 5 | 0 | 0 | 0 | 0 | 0 | 0 | 4 | 5 | 5 | 5 | 5 | 5 |
|  | 2.5 | 0 | 0 | 0 | 0 | 0 | 0 | 3 | 4 | 4 | 4 | 4 | 3 |
|  | 1.25 | 0 | 0 | 0 | 0 | 0 | 0 | 2 | 2 | 2 | 2 | 2 | 2 |

NOTE.—(1) Compound number in the table is the same as in Table 1. (2) A=French Patent No. 1,328,112: Benzyl-N,N-diethylthiolcarbamate.

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities.

It will be appreciated that the instant specification and examples are set forth by way of illustration and not limitation, and that various modifications and changes may be made without departing from the spirit and scope of the present invention.

What is claimed is:

1. A thiol carbamic acid ester of the formula:

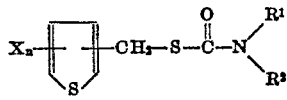

in which
X is chlorine or bromine,
R¹ and R² are lower alkyl, allyl, benzyl, cyclohexyl, or together with the nitrogen form a piperidino or hexamethylenimino radical, and
n is 1 or 2.

2. Compound according to claim 1 wherein said compound is 5 - chloro-2-thienylmethyl-N,N-dimethylthiolcarbamate having the formula:

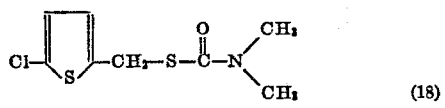  (18)

3. Compound according to claim 1 wherein said compound is 5-chloro-2-thienylmethyl - N,N - diethylthiolcarbamate having the formula:

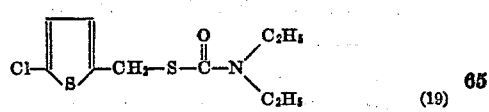  (19)

4. Compound according to claim 1 wherein said compound is 5-chloro-2-thienylmethyl - N,N - diallylthiolcarbamate having the formula:

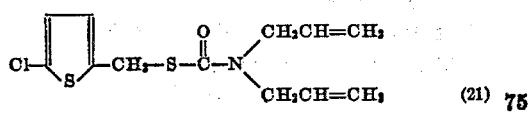  (21)

5. Compound according to claim 1 wherein said compound is 5 - chloro-2-thienylmethyl-N,N-pentamethylenethiolcarbamate having the formula:

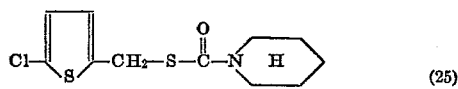  (25)

6. Compound according to claim 1 wherein said compound is 5 - chloro-2-thienylmethyl-N,N-hexamethylenethiolcarbamate having the formula:

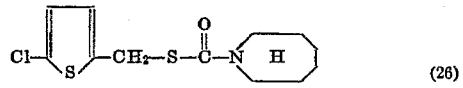  (26)

7. Compound according to claim 1 wherein said compound is 5 - bromo-2-thienylmethyl-N,N-dimethylthiolcarbamate having the formula:

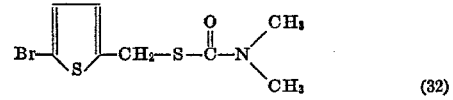  (32)

8. Compound according to claim 1 wherein said compound is 5-bromo-2-thienylmethyl - N,N - diethylthiolcarbamate having the formula:

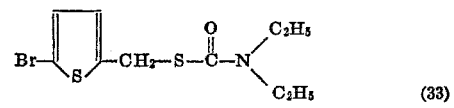  (33)

9. Compound according to claim 1 wherein said compound is 5 - bromo-2-thienylmethyl-N,N-diisopropylthiolcarbamate having the formula:

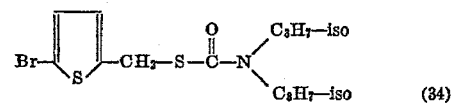  (34)

10. Compound according to claim 1 wherein said compound is 2,5 - dichloro-3-thienylmethyl-N,N-di-ethylthiolcarbamate having the formula:

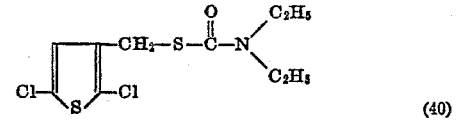  (40)

11. Compound according to claim 1 wherein said compound is 2,5-dichloro-3-thienylmethyl-N,N-dimethylthiolcarbamate having the formula

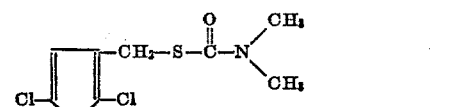  (39)

(References on following page)

References Cited

UNITED STATES PATENTS

| | | | |
|---|---|---|---|
| 3,133,947 | 5/1964 | Tilles | 260—293.85 |
| 3,442,889 | 5/1969 | D'Amico | 260—293.74 |
| 3,436,402 | 4/1969 | Cassady et al. | 260—326.3 N |
| 3,231,564 | 1/1966 | Nyquist | 260—455 A |
| 2,919,182 | 12/1959 | Harman et al. | 71—66 |
| 3,330,821 | 7/1967 | Harman et al. | 424—244 |

FOREIGN PATENTS

| | | | |
|---|---|---|---|
| 201,380 | 11/1967 | U.S.S.R. | 260—455 A |
| 1,328,112 | 4/1963 | France | 260—455 A |

OTHER REFERENCES

C.A., 72:11536s (1970), Wakamori et al.
C.A., 63:5580–5581 (1965), Federov et al.

HENRY R. JILES, Primary Examiner
S. D. WINTERS, Assistant Examiner

U.S. Cl. X.R.

71—90; 260—332.2 R, 332.5, 329 S, 326.35, 326.83, 239 B, 293.85, 513.5